UNITED STATES PATENT OFFICE.

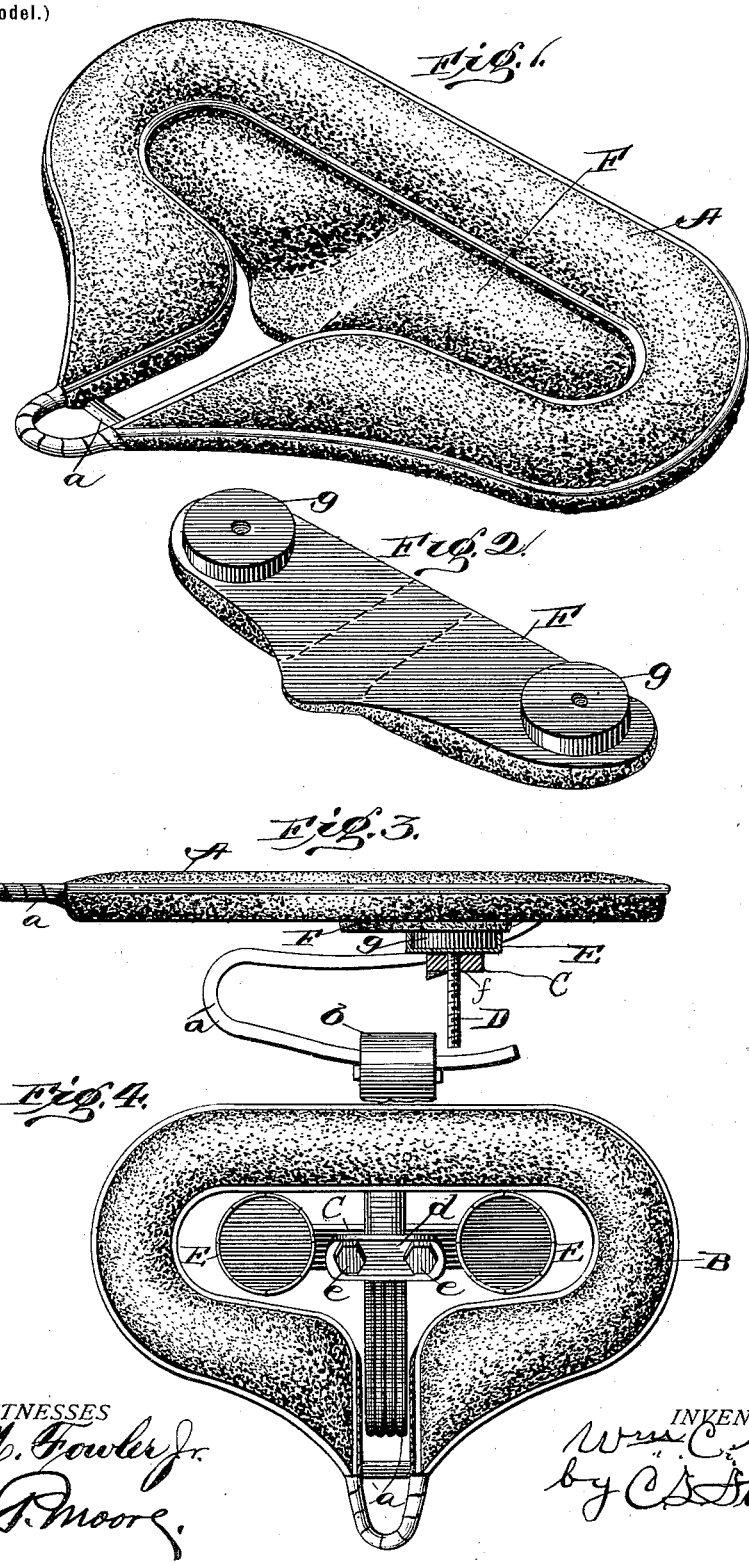

WILLIAM CHAUNCEY GATES, OF AUBURN, NEW YORK.

BICYCLE-SADDLE.

SPECIFICATION forming part of Letters Patent No. 628,704, dated July 11, 1899.

Application filed November 2, 1897. Serial No. 657,145. (No model.)

*To all whom it may concern:*

Be it known that I, WILLIAM CHAUNCEY GATES, a citizen of the United States, residing at Auburn, in the county of Cayuga, State of New York, have invented certain new and useful Improvements in Bicycle-Saddles, of which the following is a description, reference being had to the accompanying drawings and to the letters of reference marked thereon.

My invention relates to an improvement in saddles, and while it is adaptable for use in all classes of vehicles I have designed it especially to be used upon bicycles and tricycles and have so illustrated it in the drawings.

The object of the invention is to provide a seat or saddle having two or more practically independent seating-surfaces, so that the entire area of the seat or saddle may be used to support the body or only portions thereof, certain parts being adjustable or adjustable and removable with respect to the other portion. By this adjustability an endless number of changes in the shape and bearing portion of the seat or saddle may be secured. These changes are of great value in securing an easy seat, as such changes throw the weight on different portions of the body, relieving fatigued parts.

While I have shown in the accompanying drawings and described in the specification a form of seat or saddle which I consider practical and useful, it will be understood that I do not wish to be limited either to the particular manner of adjusting the various parts with reference one to the other nor to any details of construction in the manner of forming the seat or saddle itself or in clamping it to the seat-post. While I describe in particular a saddle for use on a bicycle or vehicle, it is understood that I do not confine myself to such use, but design my invention for use on any seat, whether in a vehicle or in connection with other seats, such as piano-stools, chair-seats, office-stools, and the like. Furthermore, it will be understood that the seat or saddle may be what is known as a "hard" saddle, or it may be padded, or it may be pneumatic, as suits the convenience and desire of the user.

The invention is illustrated in the accompanying drawings, in which it is shown as a saddle for bicycles, in which—

Figure 1 represents a perspective view of one form of the saddle. Fig. 2 is a detail view showing the under side of the removable section. Fig. 3 is a sectional side elevation showing the manner of adjustment of the parts with reference one to the other. Fig. 4 is a plan view showing the adjustable section removed.

In the drawings, A represents the main portion of the saddle, herein shown as formed of the spring-wires $a$ and clamped to the seat-post by the ordinary clamp $b$, Fig. 3. The central portion of the saddle A is removed or cut away, as shown at B. Clamped to the spring-wires $a$ by a cross-piece $d$ and bolts $e$ is a cross-piece C, which, as shown, is provided at either end with a screw-threaded opening $f$, in which is threaded a vertical screw-rod D, supporting at its upper end a cup E, Fig. 3.

F represents a removable section adapted to fit into the cut-away portion of the body of the saddle and having on its under side, at either end, annular projections $g$, adapted to rest within the cups E, Fig. 2. It will be seen that when the removable section is placed in position by adjusting the screw-rods D the said central section may be raised or lowered to afford a support or not, as desired. While this central member is herein shown as removable, it will of course be understood that it may be permanently attached and simply adjustable up and down. Furthermore, I do not wish to be limited to the special means shown for adjusting the said part with reference to the main body, for any other suitable means may be used.

Various other modifications and changes may be made in the construction of my bicycle-saddle without departing from the spirit of the invention.

Having thus described my invention, what I claim as new, and desire to secure by Letters Patent, is—

1. A seat having its side portions spaced apart by an opening, a central seat portion in said open space; said central seat portion and side portions being adjustable bodily in relation to each other in a plane perpendicular one to the other and maintaining their parallel relation, and means for effecting such adjustment; substantially as described.

2. A seat comprising an annular portion, a central portion within said annular portion, one of said portions being adjustable bodily in a plane perpendicular to the other and maintaining parallel relation therewith, and means for effecting such adjustment; substantially as described.

3. In combination with the main saddle having an opening between its side portions and supporting-springs therefor, a cross-bar attached to the supporting-springs, adjustable screw-bolts passing through said cross-bar, and a supplemental saddle supported on said screw-bolts in the opening between said side portions; substantially as described.

4. In combination with the main centrally-perforated saddle and the supporting-springs therefor, a cross-bar attached to the supporting-springs, adjustable screw-bolts passing through said cross-bar, and a supplemental saddle supported on said screw-bolts in the central opening, substantially as described.

In testimony whereof I affix my signature in presence of two witnesses.

WILLIAM CHAUNCEY GATES.

Witnesses:
FRANKLIN P. TABER,
JOHN M. BRAINARD.